United States Patent [19]

Thornburg et al.

[11] 4,056,822

[45] Nov. 1, 1977

[54] LOW PROFILE SINGLE CHANNEL THERMAL ANALOG RECORDER

[75] Inventors: David D. Thornburg, Los Altos; Geoffrey O. Thompson, Palo Alto, both of Calif.

[73] Assignee: Xerox Corporation, Stamford, Conn.

[21] Appl. No.: 747,164

[22] Filed: Dec. 3, 1976

[51] Int. Cl.² .................... G01D 15/10; G01D 15/24; H05B 3/20

[52] U.S. Cl. ................................. 346/76 R; 346/136; 219/216; 219/469

[58] Field of Search ............ 346/76 R, 136; 219/216, 219/388 R, 388 W, 388 C, 469-471

[56] References Cited

U.S. PATENT DOCUMENTS

| 3,506,804 | 4/1970 | Schippers et al. | 338/217 X |
| 3,921,119 | 11/1975 | Caddock | 338/217 |
| 4,006,414 | 2/1977 | Parker | 324/96 X |

FOREIGN PATENT DOCUMENTS 901,432  11/1953  Germany ........................... 346/136

Primary Examiner—George H. Miller, Jr.
Attorney, Agent, or Firm—M. J. Colitz, Jr.; T. J. Anderson; Leonard Zalman

[57] ABSTRACT

A paper transport system used in connection with a thermal analog recorder is provided. This system engages the paper for a predetermined length of time and subsequently releases it employing mechanical means. Roller means are provided for engaging and transporting a heat sensitive paper. When the test paper is inserted into the nip formed between the roller means, a tapered resistor element residing on at least one of the rollers is made to develop a non-uniform temperature profile when energized from the output of a test source which permanently marks or records on the test paper. An improved method of single channel thermal analog recording is also disclosed employing this device.

10 Claims, 1 Drawing Figure

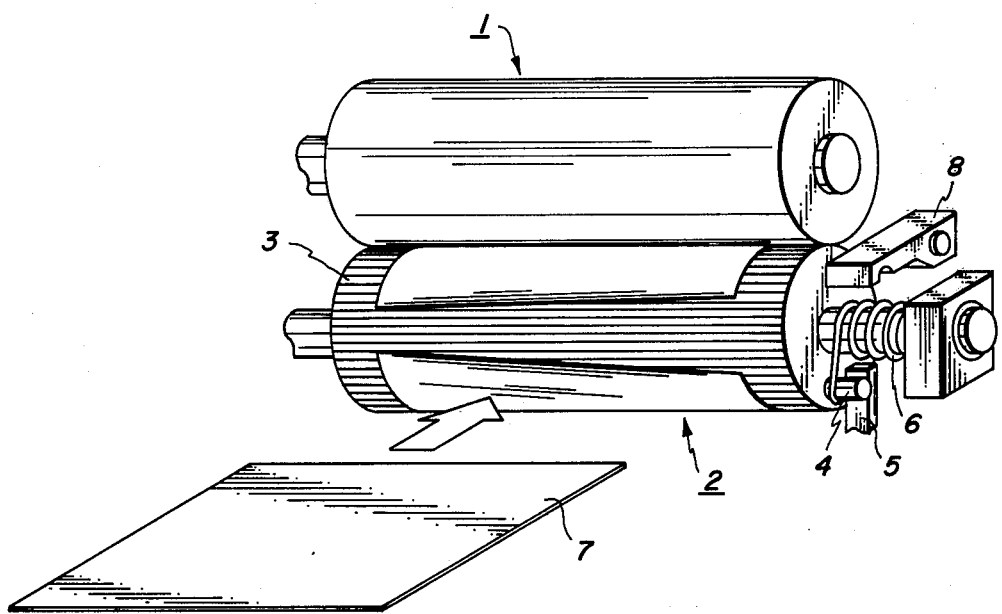

LOW PROFILE SINGLE CHANNEL THERMAL ANALOG RECORDER

BACKGROUND OF THE INVENTION

This invention relates to thermal analog recording media and more specifically to a low profile single channel thermal analog recorder. It is known that in the quality control testing and operability testing of various and sundry pieces of equipment in the electronics and electromechanical technologies a multitude of tests are performed on the articles to be evaluated before they are put into the channels of commerce. As can readily be seen such tests in lieu of advancing technology and sophisticated consumers with increased consumer protection concerns are rapidly increasing to justify a manufacturer's entry of their product into the marketplace.

These tests are tabulated and evaluated in order to give levels of assurance to the quality assurance people involved who in turn report this to management as an indication that production is proceeding in accordance with design and operating criteria which will result in a substantially flawless product.

In the process of testing, tabulating and accumulating the test results large amounts of individual tests must be performed, recorded, and accumulated and reported. As for example the voltage drop across a resistor, the impedance of a certain circuit, the current through another and so on.

Heretofore various and sundry test apparatus were required to perform these tests which were relatively expensive and complicated to operate on a mass production basis in order to test, record and tabulate production runs.

Now with the advent of tapered resistor technology, inexpensive analog recorder devices may be provided which are ideal for such applications. These devices incorporate and employ a tapered resistor element which develops a non-uniform temperature profile on electrical energization and is interacted after being energized with selected heat sensitive media to provide a number of very useful effects and devices which may be employed in a great many testing applications as hereinabove with ease, simplicity and greater economy than heretofore possible. The basis for this technology, the tapered resistor element, is more specifically defined in U.S. Ser. No. 747,167 filed concurrently herewith which is hereby respectfully incorporated by reference.

Generally described therein a conventional resistive device is seen to be a resistive film having a uniform thickness which has been formed into a resistor of a specified width and length. This film is then placed on an insulating substrate which is bonded to a heat sink. When an electrical current I is passed through the resistor the production of Joule heat causes a steady state temperature above ambient $\Delta T$ which if thermal fringing affects are neglected may be theoretically defined by the relationship $$\Delta T = \frac{d_s I^2 \rho_s}{K_s W^2} \qquad (\text{Eq. 1})$$

in which $d_s$ and $K_s$ are respectively the thickness and thermal conductivity of the substrate, and $\rho_s$ is the sheet resistivity of the resistive material measured in ohms/square. (Note: $\rho_s = \rho/d$ where $\rho$ is the bulk resistivity of the resistive material.) It is readily seen from this illustration that since the width of the resistor is uniform the local power dissipation and hence the temperature rise is also uniform so that no temperature gradient is established and the unique and utilizable effect of the device of the instant invention is now realized.

However as is seen in FIG. 2 of U.S. Ser. No. 747,167 filed concurrently herewith a device may be provided including a resistive film which significantly has a varying width in a horizontal plane while the thickness remains uniform. This film may be placed on an insulating substrate 2 which in turn is bonded to a heat sink 3. Now it is seen that the width of the resistive element 1 is a monotonically increasing function of position along the length of the element or in simple terms the resistive element is tapered. In the event the slope of the taper is gradual over a distance comparable with the substrate thickness, Equation 1 recited above will still be applicable for a first approximation. When a tapered resistor is energized the local power generation will vary along the length of the resistor so that the points of prescribed temperature rise can be made to move along the tapered resistor by varying the current flowing through the device.

Although the non-uniformity of the width of the resistive film may vary in any suitable fashion it is assumed for purposes of this discussion that the taper is linear as is seen in FIG. 1 of said application so that the following relationship is theoretically true: $w = w_o + bx$ $<x<1$ (Eq.2) in which $w_o$ is the width at the narrow end of the taper, $b$ is the slope of the taper and $x$ is the distance along the resistor measured from the narrow end. Assuming that the tapered resistive element is in contact with for example a thermographic substance which undergoes a color change when heated to the temperature $T'$ or above as the current is increased in the tapered resistor a colored line of $x'$ will be drawn. The length of this line may theoretically be derived as follows: the temperature differential $\Delta T'$ is defined as $\Delta T' = T' - T_{amb}$ where $T_{amb}$ is the ambient temperature. Combining Equations 1 and 2 yields the relationship between the applied current and the distance $x'$ over which the tapered resistor will be heated to temperature $T'$ or above, $$x' = \frac{I(d_s \rho_s / K_s \Delta T')^{\frac{1}{2}} - w_o}{b} \qquad (\text{Eq. 3})$$

It is seen that when $w_o$ is greater than 0 no region of the taper will be hotter than $T'$ for currents given by $$I < \frac{w_o}{(d_s \rho_s / K_s \Delta T')^{\frac{1}{2}}} \qquad (\text{Eq. 4})$$

As hereinbefore described it is now possible to provide simple recording devices employing tapered resistor technology which are very useful, which are applicable to the testing procedures above described.

It is therefore an object of this invention to provide an analog recorder devoid of the above noted deficiencies.

Still another object of this invention is to provide a novel low profile single channel thermal analog recorder.

Yet another object of this invention is to employ a thermal analog recorder which incorporates its own mechanical paper transporting means.

Still another object of this invention is to provide an efficient method of paper transport to and from thermal analog recorders.

Again another object of this invention is to provide a totally mechanical assembly to transport paper in connection with thermal analog recorders.

Yet still another object of this invention is to provide a paper transporting system used in connection with a thermal analog recorder which engages the paper for a predetermined length of time and subsequently releases it employing mechanical means.

These and other objects are accomplished generally speaking by providing a paper transport system including an upper thermally conductive roller and an electrically insulating lower roller on which is placed a tapered heating element. This lower roller may also contain a pin which in the rest position is loaded against the pin stop by a coil spring. Upon insertion of the heat sensitive paper on which the recording is to be made of the test object for example into the nip of the rollers, rotation of the rollers will occur until the pin is rotated an appropriate distance to reach a latch from behind which terminates the travel of the pin. In this position the tapered resistor will be located in the roller nip and will be pressed along the heat sensitive paper. Current is then applied to the tapered resistor in accordance with the test function to be performed and the heat sensitive media respond to the Joule heat which is a result of the application of this current along the taper as hereinabove described. This step is usually initiated by contact of the pin with a latch. When the test has been completed and the paper properly marked or in the event no test occurs by reason of a failure, etc., the latch is released and the roller is driven to its rest position thus expelling the paper which has now been recorded on if the item being evaluated successfully at least tested.

To control compression of the heat sensitive paper in the roller nip allows the possibility of a more controlled printed line width and is available from a flat platen transport system.

The general premise of the system of the instant invention having been described the specifics of the instant invention will be more nearly understood with reference to the drawing of which:

FIG. 1 represents a typical low profile single channel thermal analog recorder.

In FIG. 1 is seen an upper thermally conductive roller 1 and an electrically insulating lower roller 2 on which is placed a tapered heating element 3. The lower roller contains a pin 4 which in the rest position is loaded against the pin stop 5 by the coil spring 6. When the heat sensitive paper 7 is inserted into the nip in the rollers 1 & 2, these rollers will rotate until the pin 4 is against the latch 8 from behind the latch. In this position the tapered resistor will be located in the roller nip and will be pressed along the heat sensitive paper. Test current is then applied to the tapered resistor resulting in the desired marking on the paper thus completing the test. When this step is initiated by contact of the pin with the latch. When the step is completed latch 8 is released and the roller 2 is driven to its rest position thus expelling the paper.

To further define the specifics of the present invention, the following examples are intended to illustrate and not limit the particulars of the present system. Parts and percentages are by weight unless otherwise indicated.

EXAMPLE I

An upper thermally conductive roller fabricated of aluminum having a length of 5 inches and a diameter of 1 inch is placed in operative relationship with an electrically insulating lower roller fabricated of delrin having a length of 5 inches and a diameter of 1 inch. The lower roller has a tapered heating element fabricated thereon located at 1 inch from the end of the roller and having a taper width running from 0.020 inch to 0.060 inch along the 3 inches length of the taper. The low roller contains a pin which in the rest position is loaded against a pin stop by means of a coil spring. A heat sensitive card fabricated of 3M black imaging film and measuring 4 inches by 5 inches having sufficient rigidity is inserted into the nip formed between the rollers which is made to be about 0.020 inches (that is, the nip between the rollers is about 0.020 inch). The proper rigidity of the card and the nip between the rollers in combination with the frictional properties of the surface of the card combine in such a manner and are selected in such a manner that the rollers rotate in accordance with the linear traverse of the card, i.e., the card is inserted to 2 inches and causes the rollers to turn about 240°. At this point the pin has been rotated to reach a latch from behind which terminates the travel of the pin. In this position the tapered resistor is located in the roller nip and is pressed along the heat sensitive paper. A current of 0.2 to 0.6A is applied to the tapered resistor causing a mark to appear on the paper which is directly proportional to the heat generated along the taper which again is directly proportional to the current applied to the tapered resistor. After the test is completed the latch is released and roller is driven to its rest position thus expelling the paper and completing the test marking.

Any suitable material may comprise the upper thermally conductive roller of the instant invention. Typical thermally conductive materials include aluminum, copper, stainless steel, brass, iron, nickel, and chromium.

The lower roller may comprise any suitable electrically insulating material. Suitable electrically insulating materials include borosilicate glasses, ceramics, epoxy/glass composites, silicone rubbers, polyimides and polyethylene terephthalate.

Any suitable material may comprise the tapered heating element of the instant invention. Typical resistive materials include chromium, nichrome and nickel thin films as well as laminated foils of nichrome (a 80 Ni 20 Cr alloy), monel (a Cu,Ni alloy), Inconel (an alloy of nickel and chromium), or stainless steel.

Any suitable heat sensitive paper may be employed in the system of the instant invention. Typical heat sensitive papers include "teachers pet" NCR paper, 3M copy films, Carterfax paper, Thermofax paper, and paper used in Texas Instrument and Hewlett Packard thermal printers.

As described in U.S. Pat. No. 3,895,173 a recording paper is disclosed which forms, for example, a red color when scratched with a thermal pen or head at a certain temperature, and which forms, for example, a blue color when scratched with a thermal heat at a higher temperature.

A thermo-sensitive recording paper can be prepared by coating a carbon or the like colored pigment or dye powder on a substrate, and then coating a white, opaque thermofusible substance on the resulting pigment or dye powder layer. This recording sheet is of such a type that the thermofusible substance on the surface is scratched with a thermal stylus to expose and make visible the lower colored layer. The recording material of this type has such drawbacks that scums are formed.

A recording material which forms a color by forming a complex compound of an electron donor with an electron acceptor. This recording material is of such a type that ferric stearate and pyrogallol, for example, are independently dispersed in a binder, and the binder is softened by application of heat thereby reacting the two compounds with each other to form a visible complex compound. The color formed in this case is dark brown.

A recording material of such a type that Crystal Violet Lactone and a phenolic substance are dispersed as discontinuous particles into a thermo-softening substance such as polyvinyl alcohol, and the thermo-softening substance is softened by application of heat to give a record. The color obtained in this case is brilliant cobalt blue.

Preferred of these are "teacher's pet" type papers since they are of a rigid nature which is preferable in order to provide proper movement and tracking of the rollers upon insertion of the card.

It should be noted that the latch may be comprised of an electrically heated bimetallic strip or other electromechanical latch means as desired in order to provide the effect recited.

Although the present examples were specific in terms of conditions and materials used, any of the above listed typical materials may be substituted when suitable in the above examples with similar results. In addition to the steps used to carry out the process of the present invention, other steps or modifications may be used if desirable. In addition, other materials may be incorporated in the system of the present invention which will enhance, synergize, or otherwise desirably affect the properties of the systems for their present use.

Anyone skilled in the art will have other modifications occur to him based on the teachings of the present invention. These modifications are intended to be encompassed within the scope of this invention.

What is claimed is:

1. A thermal analog recorder comprising an upper thermally conductive roller and an electrically insulating lower roller which is engageably positioned with respect to said upper roller to provide a nip therebetween through which recording paper may pass, said lower roller having disposed on at least part of the surface thereof a tapered resistor heating element said tapered resistor element comprising a tapered electrically resistive element which develops a non-uniform temperature profile upon electrical energization from the output of a test source, a pin carried by the lower roller, a pin stop against which said pin is loaded in the rest position by a coil spring, and a latch which is positioned to terminate the travel of the pin upon insertion of the heat sensitive recording paper.

2. The recorder as defined in claim 1 wherein said thermally conductive roller comprises one material selected from the group consisting of aluminum, copper, stainless steel, brass, iron, nickel, and chromium.

3. The recorder as defined in claim 1 wherein the resistive element resides on an electrically insulating substrate.

4. The device as defined in claim 3 wherein said substrate comprises one material selected from the group consisting of borosilicate glasses, ceramics epoxy/glass composites, silicone rubbers, polyimides and polyethylene terephthalate.

5. The recorder as defined in claim 1 wherein said resistive element comprises one material selected from the group consisting of chromium, nickel, nickel chromium alloys, copper nickel alloys and stainless steel.

6. A thermal analog recorder comprising roller means for engaging and transporting heat sensitive paper, said means comprising two engageably positioned rollers forming a nip therebetween, said nip being of sufficient size to provide frictional engagement of the test paper when inserted therein and corresponding travel of the roller means corresponding to the insertion of the paper, a tapered resistor element residing on at least one of said rollers said element comprising a tapered electrically resistive element which develops a non-uniform temperature profile on electrical energization from the output of a test source, means for biasing the roller carrying the tapered resistor element, means for terminating the traverse of the roller means and means for releasing said biasing means so as to expel the test paper after recording.

7. The device as defined in claim 6 wherein said biasing means comprises a coil spring.

8. The device as defined in claim 6 wherein said terminating means comprises a pin and latch assembly which are releasably engageable.

9. An improved method of single channel thermal analog recording comprising providing a roller assembly said roller assembly comprising two rollers forming a nip therebetween one of said rollers carrying a tapered resistor element said tapered resistor element comprising a tapered electrically resistive element which develops a non-uniform temperature on electrical energization from the output of a test source, inserting a heat sensitive paper in the nip of said roller assembly thus rotating said roller assembly, terminating the travel of said roller assembly so that the tapered resistor element is in operative relationship with the paper and the other roller, supplying a test current to said roller assembly thus creating a mark corresponding to the test current on said recording paper and releasing said paper after recording.

10. The process as defined in claim 9 wherein said heat sensitive test recording paper comprises a complex compound of an electron donor with an electron acceptor said material being selected from the group consisting of ferric sterate in pyrogallol.

* * * * *